United States Patent [19]

Shin

[11] Patent Number: 5,737,149
[45] Date of Patent: Apr. 7, 1998

[54] FLOPPY DISK DRIVE HAVING A DRIVE LEVER FOR DRIVING A DISK

[75] Inventor: Seong Ho Shin, Kyunggi-do, Rep. of Korea

[73] Assignee: Samsung Electro-Mechanics Co., Ltd., Suwon, Rep. of Korea

[21] Appl. No.: 692,730

[22] Filed: Aug. 6, 1996

[30] Foreign Application Priority Data

Mar. 28, 1996 [KR] Rep. of Korea ............ 1996-6135

[51] Int. Cl.$^6$ ................ G11B 17/02
[52] U.S. Cl. ............ 360/99.04; 360/99.08; 360/99.12
[58] Field of Search ............ 360/99.04, 99.05, 360/99.12, 99.08

[56] References Cited

U.S. PATENT DOCUMENTS 4,825,314  4/1989  Maekawa et al. ............ 360/99.08
4,855,850  8/1989  Nagaoka et al. ............ 360/99.12
4,989,107  1/1991  Tsukahara ............ 360/99.12

Primary Examiner—John H. Wolff
Attorney, Agent, or Firm—Ladas & Parry

[57] ABSTRACT

A floppy disk drive having a drive lever for driving a floppy disk. The drive lever is made from a low-cost metal plate and is elastically supported by a coil spring, thereby reducing the manufacturing cost. The drive lever has an arcuate shape which is bent inwardly in such a manner that an outward force of the drive lever is increased, thereby reducing friction and abrasion of the driving pin. The floppy disk drive has a rotor case of a driving motor, and a drive lever disposed at an inner bottom portion of the rotor case. The drive lever has a first end at which the driving pin protrudes through an opening in the rotor case, and a second opposite end which is secured to the case by a screw surrounded by the coil spring. Due to the coil spring, the drive lever offers elastic resistance when the driving pin is engaged in an engagement hole of a floppy disk hub. The drive lever is straight or has an arcuate shape which is bent inwardly.

4 Claims, 4 Drawing Sheets

FLOPPY DISK DRIVE HAVING A DRIVE LEVER FOR DRIVING A DISK

BACKGROUND OF THE INVENTION

1. Field of the Invention

The present invention relates to a floppy disk drive for a computer, and more particularly to a floppy disk drive having a drive lever for driving a floppy disk.

2. Description of the Prior Art

Generally, as shown in FIG. 8, a floppy disk drive comprises a rotor case a, a drive lever c which is constructed as leaf spring and fixed to the rotor case a by means of a rivet b, and a driving pin d which is attached to an end of the drive lever c and protrudes through an opening e in the rotor case A.

When the rotor case a rotates in a state that the driving pin d of the drive lever c is inserted in an engagement hole h formed in a hub G of a floppy disk F, the hub g of disk f is also rotated by the driving pin D. At this time, the drive lever c must have elasticity in the longitudinal direction of the driving pin d fixed at the end of the drive lever c.

Accordingly, the above-mentioned conventional drive lever c is manufactured of expensive leaf spring material. In addition, since the rivet b for securing the drive lever c is also expensive, the cost for manufacturing the conventional drive lever c is high. Particularly, as shown in FIG. 7, the conventional drive lever c has an arcuate shape which is bent outwardly with respect to a center of the rotor case a, so that an outward force of the drive lever c is always exerted weakly while the hub G of the floppy disk F is rotated by the driving pin d fixed at the end of the drive lever C. As a result, the driving pin d may frequently and repeatedly contact the engagement hole h, thereby causing abrasion of the driving pin d.

SUMMARY OF THE INVENTION

The present invention has been made to overcome the above described problems of the prior art, and accordingly, it is an object of the present invention to provide a floppy disk drive having a drive lever for driving a floppy disk, wherein the drive lever is manufactured as a low-cost rigid, metal plate which acts elastically by a coil spring, so that the cost for manufacturing the drive lever is reduced.

Another object of the present invention is to provide a drive lever having an arcuate shape which is bent inwardly in such a manner that the outward force of the drive lever becomes greater, thereby reducing friction and abrasion of the driving pin.

To achieve the above objects, the present invention provides a floppy disk drive driven from a driving motor, a rotor case for the driving motor, and a drive lever disposed at an inner bottom portion of the rotor case. The drive lever has a first end at which the driving pin protrudes through an opening in the rotor case, and a second opposite end which is secured to the rotor case by a screw surrounded by a coil spring. The drive lever is resiliently biassed by the coil spring when the driving pin protrudes through the opening and is engaged in the engagement hole in the floppy disk hub. The drive lever can have a straight shape or have an arcuate inwardly bent.

BRIEF DESCRIPTION OF THE DRAWINGS

The above object, other features and advantages of the present invention will become more apparent by describing the preferred embodiments thereof with reference to the accompanying drawings, in which.

DESCRIPTION OF THE PREFERRED EMBODIMENTS

Figure 1:
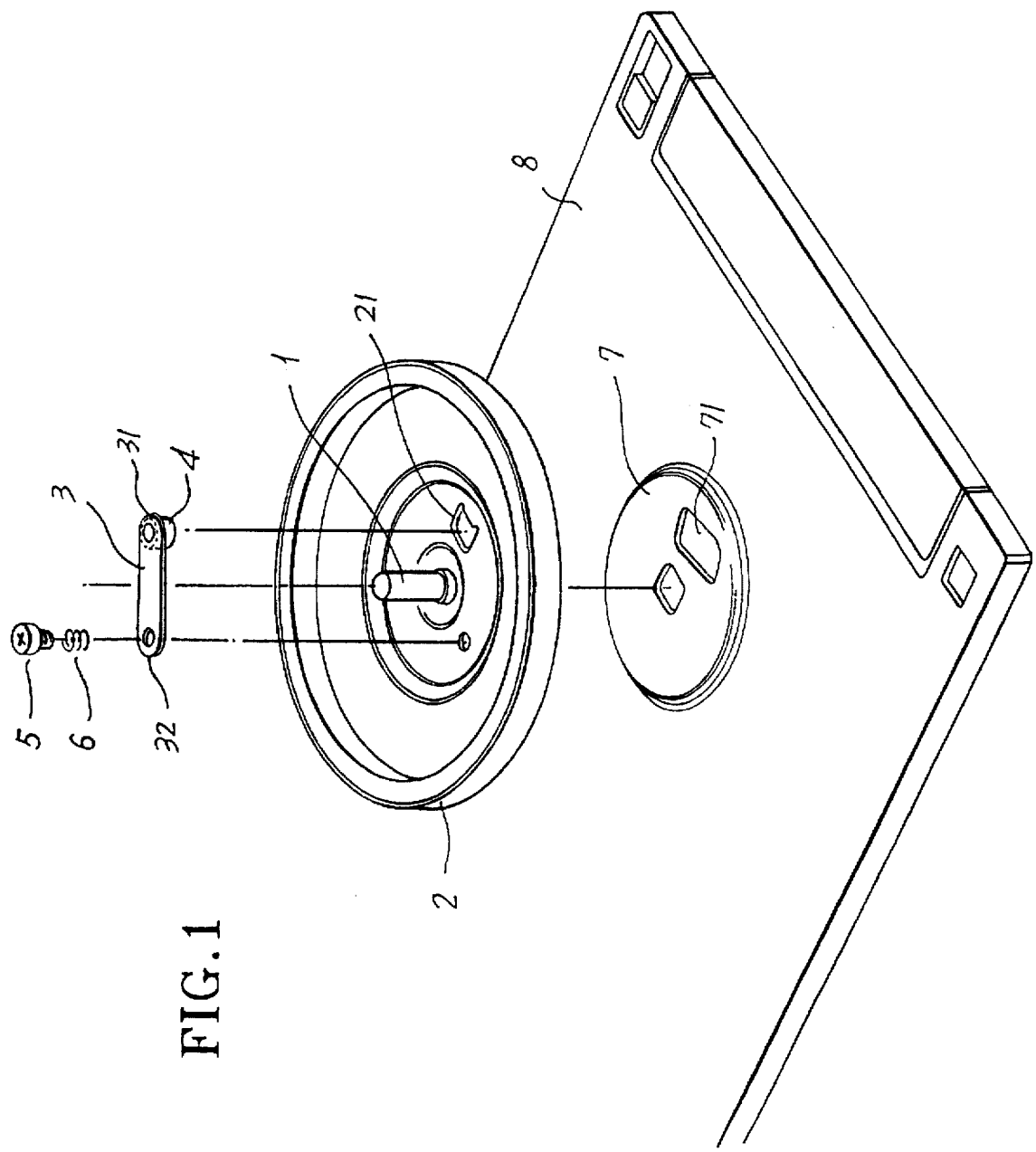
FIG. 1 is an exploded perspective view of a construction of a disk drive of the present invention.

FIG. 1 is an exploded perspective view showing the construction of a floppy disk drive of the present invention. As shown in FIG. 1, the floppy disk drive of the present invention comprises a rotor case 2 of a drive motor (not shown) having a rotating shaft 1, and a drive lever 3 fixed to the rotor case 2. The drive lever 3 has a straight shape and one end 32 thereof is secured to the case 2 by a screw 5. A coil spring 6 is interposed between the drive lever 3 and the screw 5 in such a manner that the drive lever 3 is constantly urged into engagement with a floppy disk. In this regard, a driving pin 4, which is provided at the other end 31 of the drive lever 3, passes through an opening 21 in the rotor case 2 and is engaged in an engagement hole 71 formed in a hub 7 of the floppy disk 8 in opposition to the drive lever 3.

Figure 4:
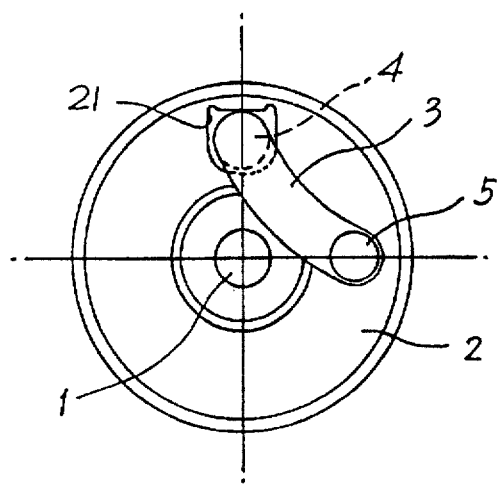
FIG. 4 is a view showing a drive lever according to a second embodiment of the present invention.

According to another embodiment of the present invention as shown in FIG. 4, the drive lever 3 has an arcuate shape which is bent inwardly with respect to a center of the rotor case 2.

Hereinafter, the operation of the present invention having the above mentioned construction will be described.

Figure 2:
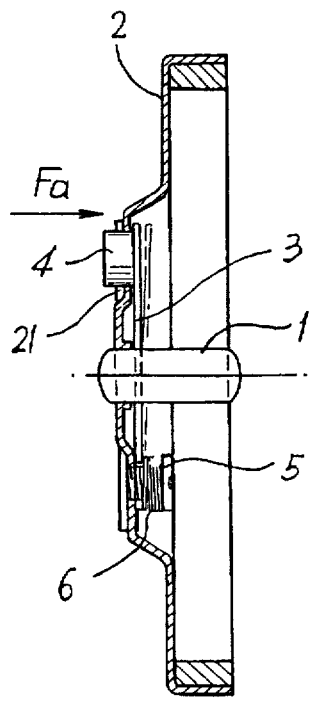
FIG. 2 is a sectional view showing a drive lever installed in the disk drive according to the present invention.
Figure 3:
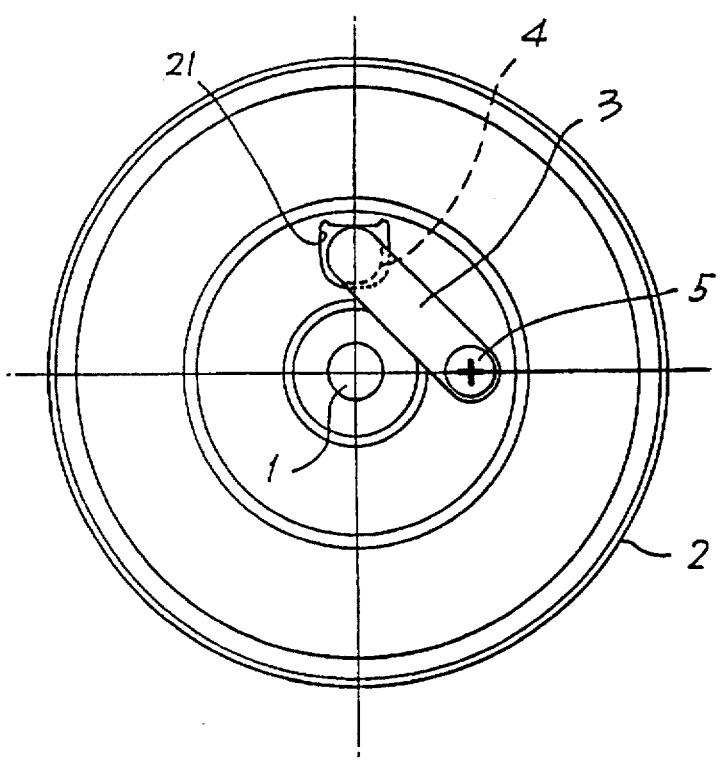
FIG. 3 is a view showing a drive lever according to a first embodiment of the present invention.

As shown by the dotted line in FIG. 2, the drive lever 3 of the present invention can move due to the coil spring 6 at the end 32 thereof when the floppy disk 8 is mounted on the disk drive, so that a force Fa applied to the drive lever 3 may be elastically resisted.

Figure 5:
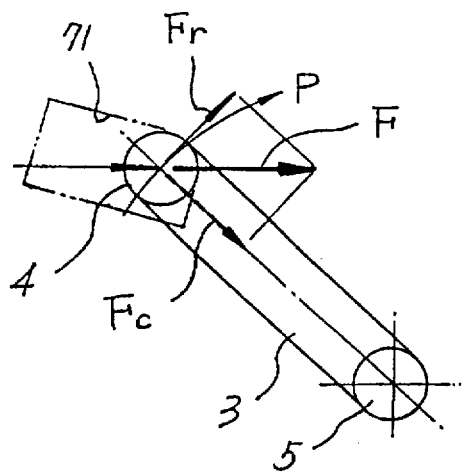
FIG. 5 is an operational plan view of the disk drive of the present invention.

As shown in FIG. 5, as a rotational force F for rotating the floppy disk 8 is applied, the drive lever 3 of the present invention rotates in the P direction about a hinge point formed at end 32 of the drive lever 3. At this time, since the driving pin 4 is engaged in the engagement hole 71, the rotational force F is divided into a first component force Fr which is directed in the P direction and a second component force Fc which acts on the drive lever 3. The first component force Fr urges the driving pin 4 into close contact with a corner of the engagement hole 71.

Figure 7:
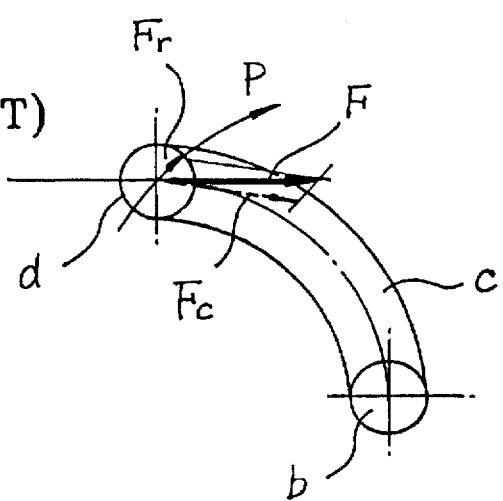
FIG. 7 is an operational plan view of a conventional drive lever.
Figure 8:
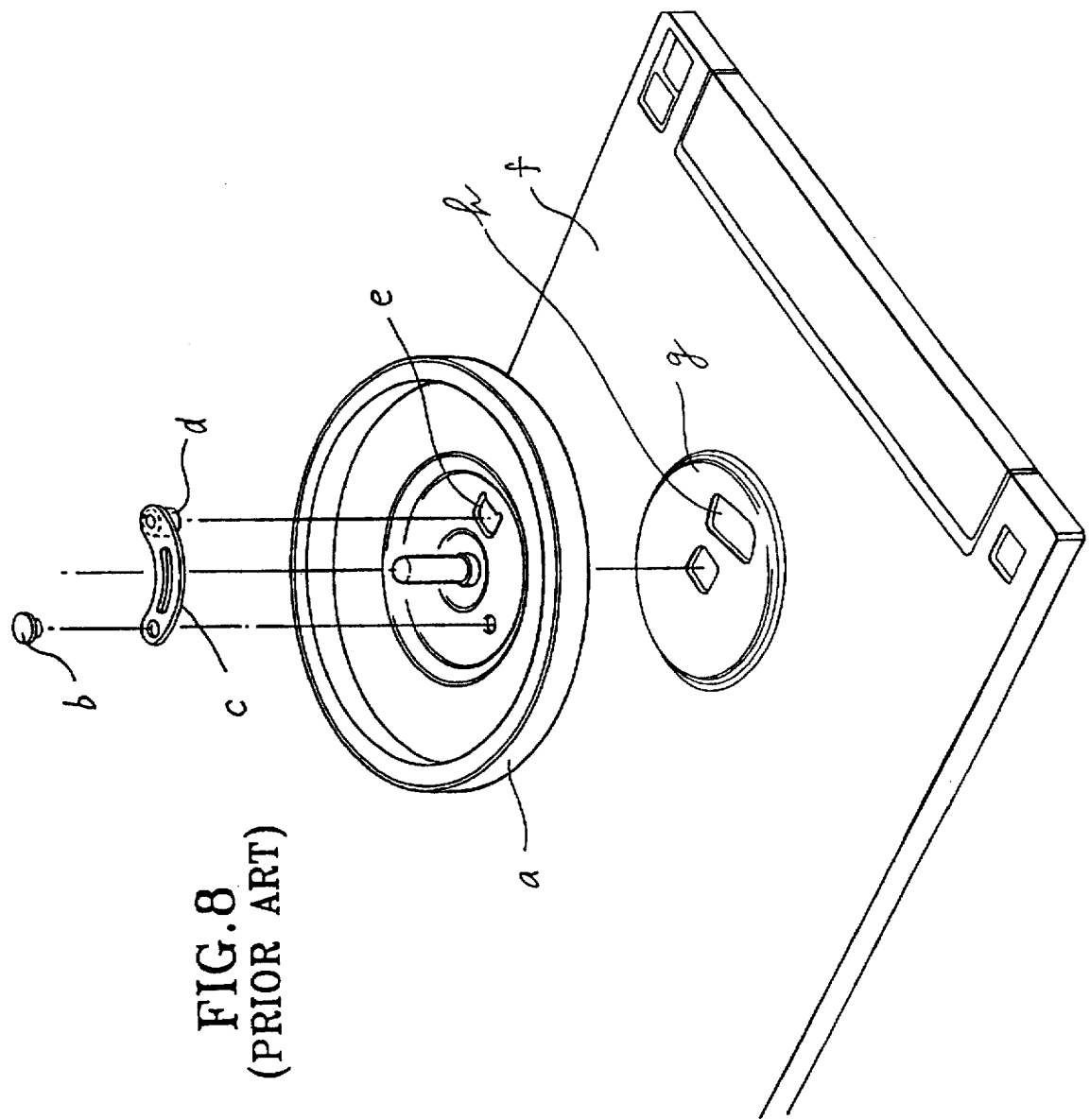
FIG. 8 is an exploded perspective view of a conventional disk drive.

As a result, the angle of the first component force Fr with respect to the rotational force F becomes larger as compared with that of the conventional drive lever shown in FIG. 7, so that the first component force Fr thereof, which urges the driving pin 4 into contact with the engagement hole 71, becomes greater than that of the conventional drive lever. Accordingly, the shaking of the driving pin 4 is reduced when the driving pin 4 comes into contact with the engagement hole 71, so that abrasion of the driving pin 4 caused by friction between driving pin 4 and the engagement hole 71 is reduced thereby extending the life of the driving pin 4.

Figure 6:
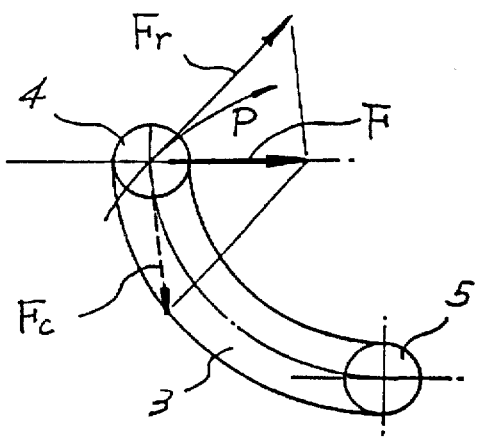
FIG. 6 is an operational plan view showing a drive lever according to a third embodiment of the present invention.

In addition, according to another embodiment of the present invention shown in FIG. 6, the drive lever 3 has an arcuate shape which is bent inwardly, so that the angle of the first component force Fr with respect to the rotational force F becomes larger than that of the drive lever shown in FIG. 5, so that the first component force Fr thereof becomes greater than that of the drive lever shown in FIG. 5. As a result, the driving pin 4 can be closely secured in the engagement hole 71 when the driving pin 4 rotates.

As mentioned above in detail, since the drive lever 3 of the present invention is fixed to the rotor case by screw 5 and the coil spring 6 is mounted at the hinge point of the end 32 of the drive lever 3, the present invention does not require the us of an expensive rivet or of a drive lever made the elastic leaf, spring material of the prior art so the cost for manufacturing the drive lever is reduced. Particularly, since the drive lever 3 of the present invention has a straight shape or an arcuate shape bent inwardly, the first component force Fr urging the driving pin 4 into contact with the engagement hole 71 becomes greater so that friction or abrasion thereof is reduced, thereby extending the life of the driving pin 4.

While the present invention has been particularly shown and described with reference to the preferred embodiment thereof, it will be understood by those skilled in the art that various changes in form and detail may be effected therein without departing from the spirit and scope of the invention as defined by the appended claims.

What is claimed is:

1. Drive apparatus for a floppy disk comprising:

a rotor case, a drive lever secured to said rotor case, said drive lever having opposite ends, a driving pin secured at one of said ends of the drive lever to protrude through an opening provided in said rotor case for drivingly engaging in an engagement hole in a floppy disk, and means for securing said drive lever to said rotor case at the other of said ends of the drive lever while providing resilience for said driving pin longitudinally thereof, said means comprising a screw secured to said rotor case and supporting said drive lever at said other of the ends thereof and a coil spring surrounding said screw and acting on said drive lever to urge the drive lever against the rotor case, said drive lever being made as a non-elastic plate and said resilience for the driving pin being provided substantially entirely by said coil spring.

2. Driving apparatus as claimed in claim 1, wherein said plate is made of metal.

3. Driving apparatus as claimed in claim 1, wherein said drive lever is straight.

4. Driving apparatus as claimed in claim 1, wherein said drive lever is arcuate and bent inwardly towards a center of the rotor case.

* * * * *